(12) United States Patent
Sakamoto et al.

(10) Patent No.: US 12,196,094 B2
(45) Date of Patent: Jan. 14, 2025

(54) FLOW CHANNEL FORMING PLATE, BLADE AND GAS TURBINE INCLUDING THIS, AND METHOD OF MANUFACTURING FLOW CHANNEL FORMING PLATE

(71) Applicant: MITSUBISHI HEAVY INDUSTRIES, LTD., Tokyo (JP)

(72) Inventors: Koya Sakamoto, Yokohama (JP); Yoshio Fukui, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 278 days.

(21) Appl. No.: 17/563,624

(22) Filed: Dec. 28, 2021

(65) Prior Publication Data

US 2022/0275734 A1     Sep. 1, 2022

(30) Foreign Application Priority Data

Jan. 22, 2021 (JP) .................... 2021-008642

(51) Int. Cl.
*F01D 25/12* (2006.01)
*F01D 5/18* (2006.01)
(Continued)

(52) U.S. Cl.
CPC .............. *F01D 25/12* (2013.01); *F01D 5/187* (2013.01); *F01D 9/023* (2013.01); *F01D 9/041* (2013.01);
(Continued)

(58) Field of Classification Search
CPC .......... F01D 25/12; F01D 5/187; F01D 9/023; F01D 9/041; F01D 9/04; F01D 5/08;
(Continued)

(56) References Cited

U.S. PATENT DOCUMENTS

| | | | |
|---|---|---|---|
| 4,946,346 A * | 8/1990 | Ito ........................ | F01D 5/189 415/115 |
| 6,241,467 B1 * | 6/2001 | Zelesky ................... | F01D 9/04 415/115 |
| 6,945,749 B2 * | 9/2005 | De Cardenas ......... | F01D 5/081 416/193 A |

(Continued)

FOREIGN PATENT DOCUMENTS

| JP | 2001-065306 | 3/2001 |
|---|---|---|
| JP | 2001-254604 | 9/2001 |

(Continued)

*Primary Examiner* — Woody A Lee, Jr.
*Assistant Examiner* — Eric A Lange
(74) *Attorney, Agent, or Firm* — Wenderoth & Ponack, L.L.P.

(57) ABSTRACT

A flow channel forming plate has a gas path surface which comes into contact with combustion gas, an opposite gas path surface which faces a side opposite to the gas path surface, an end surface formed at a circumferential edge on the gas path surface, and a lateral passage formed between the gas path surface and the opposite gas path surface and in which cooling air flows. The end surface has a rear end surface, a front end surface, and a lateral end surface. The lateral passage has, along the gas path surface and the lateral end surface, a main passage portion extending in a direction in which the lateral end surface extends, and one or more narrow passage portions extending from an end of the main passage portion on a downstream side toward the rear end surface and opening on the rear end surface.

12 Claims, 9 Drawing Sheets

(51) Int. Cl.
*F01D 9/02* (2006.01)
*F01D 9/04* (2006.01)
*F02C 7/18* (2006.01)

(52) U.S. Cl.
CPC ............ *F02C 7/18* (2013.01); *F05D 2240/11* (2013.01); *F05D 2240/304* (2013.01); *F05D 2240/35* (2013.01); *F05D 2240/81* (2013.01)

(58) Field of Classification Search
CPC .................. F02C 7/18; F05D 2240/11; F05D 2240/304; F05D 2240/35; F05D 2240/81; F05D 2220/32; F05D 2260/20
See application file for complete search history.

(56) References Cited

U.S. PATENT DOCUMENTS

| | | | | |
|---|---|---|---|---|
| 2002/0025248 A1* | 2/2002 | Lee | ........................... | B23H 9/10 |
| | | | | 415/1 |
| 2015/0007581 A1* | 1/2015 | Sezer | ....................... | F01D 11/24 |
| | | | | 60/806 |
| 2015/0013345 A1* | 1/2015 | Porter | ..................... | F01D 25/12 |
| | | | | 60/806 |
| 2016/0222786 A1 | 8/2016 | Kuwabara | | |
| 2019/0032499 A1* | 1/2019 | Matsuo | ................... | F01D 25/12 |
| 2020/0131929 A1 | 4/2020 | Lacy et al. | | |
| 2020/0300104 A1 | 9/2020 | Fukui | | |

FOREIGN PATENT DOCUMENTS

| | | |
|---|---|---|
| JP | 2006-188962 | 7/2006 |
| JP | 4240737 | 3/2009 |
| JP | 5679246 | 3/2015 |
| JP | 2016-035239 | 3/2016 |
| JP | 2019-78204 | 5/2019 |
| JP | 2020-020344 | 2/2020 |
| JP | 2020-76404 | 5/2020 |

* cited by examiner

FLOW CHANNEL FORMING PLATE, BLADE AND GAS TURBINE INCLUDING THIS, AND METHOD OF MANUFACTURING FLOW CHANNEL FORMING PLATE

FIELD OF THE INVENTION

The present invention relates to a flow channel forming plate defining a combustion gas flow channel in which combustion gas flows, a blade and a gas turbine including this, and a method of manufacturing a flow channel forming plate.

Priority is claimed on Japanese Patent Application No. 2021-008642, filed Jan. 22, 2021, the content of which is incorporated herein by reference.

DESCRIPTION OF RELATED ART

A gas turbine includes a compressor which compresses air and generates compressed air, a combustor which combusts fuel in compressed air and generates combustion gas, and a turbine which is driven by means of combustion gas. The turbine has a flow channel forming plate which defines a combustion gas flow channel in which combustion gas flows. Since this flow channel forming plate is exposed to combustion gas, there is a need to perform cooling. For this reason, cooling air passages in which cooling air flows are formed in the flow channel forming plate.

For example, the flow channel forming plate described in the following Patent Document 1 has a gas path surface which comes into contact with combustion gas, an opposite gas path surface which faces a side opposite to the gas path surface, an end surface which is formed at a circumferential edge on the gas path surface, and a plurality of cooling air passages which are formed between the gas path surface and the opposite gas path surface. The end surface has a rear end surface, a front end surface, and a lateral end surface. One cooling air passage of the plurality of cooling air passages extends along the lateral end surface and opens on the rear end surface.

PATENT DOCUMENTS

[Patent Document 1] Japanese Unexamined Patent Application, First Publication No. 2016-035239

SUMMARY OF THE INVENTION

Technical Problem

In the technology described in the foregoing Patent Document 1, a part of compressed air generated by a compressor of a gas turbine is used as cooling air flowing in the plurality of cooling air passages of the flow channel forming plate. That is, a part of compressed air generated by the compressor is sent to the flow channel forming plate, and the remaining part thereof is sent to a combustor. For this reason, if a flow rate of compressed air sent to the flow channel forming plate increases, a flow rate of compressed air sent to the combustor decreases, and therefore efficiency of the gas turbine deteriorates. Thus, it is desirable that the used amount of cooling air in the flow channel forming plate be curbed.

Hence, an object of the present invention is to provide a flow channel forming plate in which a used amount of cooling air can be curbed, a blade including this, a gas turbine including this, and a method of manufacturing a flow channel forming plate.

Solution to Problem

According to an aspect of the invention for achieving the foregoing object, there is provided a flow channel forming plate defining a combustion gas flow channel in which combustion gas flows in a gas turbine. The flow channel forming plate has a gas path surface which comes into contact with the combustion gas, an opposite gas path surface which faces a side opposite to the gas path surface, an end surface which is formed at a circumferential edge on the gas path surface, and one or more lateral passages which are formed between the gas path surface and the opposite gas path surface and in which cooling air flows. The end surface has a rear end surface facing a downstream side where the combustion gas flows, a front end surface facing an upstream side on a side opposite to the downstream side and having a back-to-back relationship with the rear end surface, and a lateral end surface facing a side in a lateral direction perpendicular to a gas flowing direction in which the rear end surface and the front end surface are arranged. The one or more lateral passages have, along the gas path surface and the lateral end surface, a main passage portion extending in a direction in which the lateral end surface extends, and one or more narrow passage portions extending from an end of the main passage portion on the downstream side toward the rear end surface and opening on the rear end surface. The area of an opening in the one or more narrow passage portions on the rear end surface is smaller than a cross-sectional area of the main passage portion.

In the present aspect, since the lateral passage has one or more narrow passage portions, compared to a case of having no narrow passage portions, the flow rate of cooling air passing through this lateral passage can be curbed. In addition, in the present aspect, compared to a case in which the cross-sectional area at each of positions in the lateral passage between an inlet for cooling air and an outlet for cooling air is the same, the cross-sectional area in the main passage portion can be increased. For this reason, when the lateral passage is projected onto the gas path surface from an opposite gas path side, a projection area of the lateral passage within the gas path surface can be expanded, and the gas path surface can be cooled over a wide area.

According to another aspect for achieving the foregoing object, there is provided a flow channel forming plate defining a combustion gas flow channel in which combustion gas flows in a gas turbine. The flow channel forming plate includes a gas path surface which comes into contact with the combustion gas, an opposite gas path surface which faces a side opposite to the gas path surface, an end surface which is formed at a circumferential edge on the gas path surface, and one or more lateral passages which are formed between the gas path surface and the opposite gas path surface. The one or more lateral passages have a main passage portion extending toward a part on the end surface along the gas path surface, and a plurality of narrow passage portions extending from an end of the main passage portion to a part on the end surface and opening at a part on the end surface. All of the plurality of narrow passage portions extend in a passage extension direction in which the main passage portion extends. The plurality of narrow passage portions are arranged in a direction parallel to the gas path surface. A total area of openings at parts on the end surfaces in the plurality of respective narrow passage portions is smaller than a cross-sectional area of the main passage portion.

In the present aspect, since the lateral passage has the plurality of narrow passage portions, compared to a case of having no narrow passage portions, the flow rate of cooling air passing through this lateral passage can be curbed. In addition, in the present aspect, compared to a case in which the cross-sectional area at each of positions in the lateral passage between an inlet for cooling air and an outlet for cooling air is the same, the cross-sectional area in the main passage portion can be increased. For this reason, when the lateral passage is projected onto the gas path surface from an opposite gas path side, a projection area of the lateral passage within the gas path surface can be expanded. Moreover, in the present aspect, a plurality of narrow passage portions are arranged in a direction parallel to the gas path surface. Thus, due to the lateral passage of the present aspect, the gas path surface can be cooled over a wide range.

According to another aspect for achieving the foregoing object, there is provided a blade including the flow channel forming plate according to any one of the foregoing aspects, and a blade body which extends from the gas path surface in a blade height direction having a direction component perpendicular to the gas path surface and of which a cross-sectional shape perpendicular to the blade height direction constitutes a blade profile.

The gas turbine according to the foregoing embodiment is ascertained as follows, for example.

According to another aspect for achieving the foregoing object, there is provided a gas turbine including a combustor which is configured to generate combustion gas, and a turbine which is configured to be driven by means of combustion gas. The turbine has the flow channel forming plate according to any one of the foregoing aspects.

According to another aspect for achieving the foregoing object, there is provided a method of manufacturing a flow channel forming plate defining a combustion gas flow channel in which combustion gas flows in a gas turbine, for executing an intermediate product forming step, a groove forming step, a lid disposing step, and a passage forming step. In the intermediate product forming step, an intermediate product having a gas path surface which comes into contact with the combustion gas, an opposite gas path surface which faces a side opposite to the gas path surface, and an end surface which is formed at a circumferential edge on the gas path surface is formed. The end surface has a rear end surface facing a downstream side where the combustion gas flows, a front end surface facing an upstream side on a side opposite to the downstream side and having a back-to-back relationship with the rear end surface, and a lateral end surface facing a side in a lateral direction perpendicular to a gas flowing direction in which the rear end surface and the front end surface are arranged. In the groove forming step, a groove recessed in a direction perpendicular to the lateral end surface from the lateral end surface and extending in a direction in which the lateral end surface extends is formed within the lateral end surface of the intermediate product avoiding a part on the upstream side and a part on the downstream side. In the lid disposing step, an opening of the groove is blocked by a lid member, and a main passage portion extending in a direction in which the lateral end surface extends is formed along the lateral end surface by the groove and the lid member. In the passage forming step, one or more narrow passage portions penetrating the inside of the main passage portion from the rear end surface are formed. The area of an opening in the one or more narrow passage portions on the rear end surface is smaller than a cross-sectional area of the main passage portion.

In the flow channel forming plate manufactured in the present aspect, similar to the flow channel forming plates of the foregoing aspects, the flow rate of cooling air passing through the lateral passage can be curbed. In addition, in the flow channel forming plate manufactured in the present aspect, similar to the flow channel forming plates of the foregoing aspects, the gas path surface can be cooled over a wide area.

Advantageous Effects of Invention

According to the aspects of the present disclosure, the used amount of cooling air can be curbed.

DETAILED DESCRIPTION OF THE INVENTION

Hereinafter, embodiments according to the present disclosure will be described in detail with reference to the drawings.

Embodiment of Gas Turbine

Figure 1:
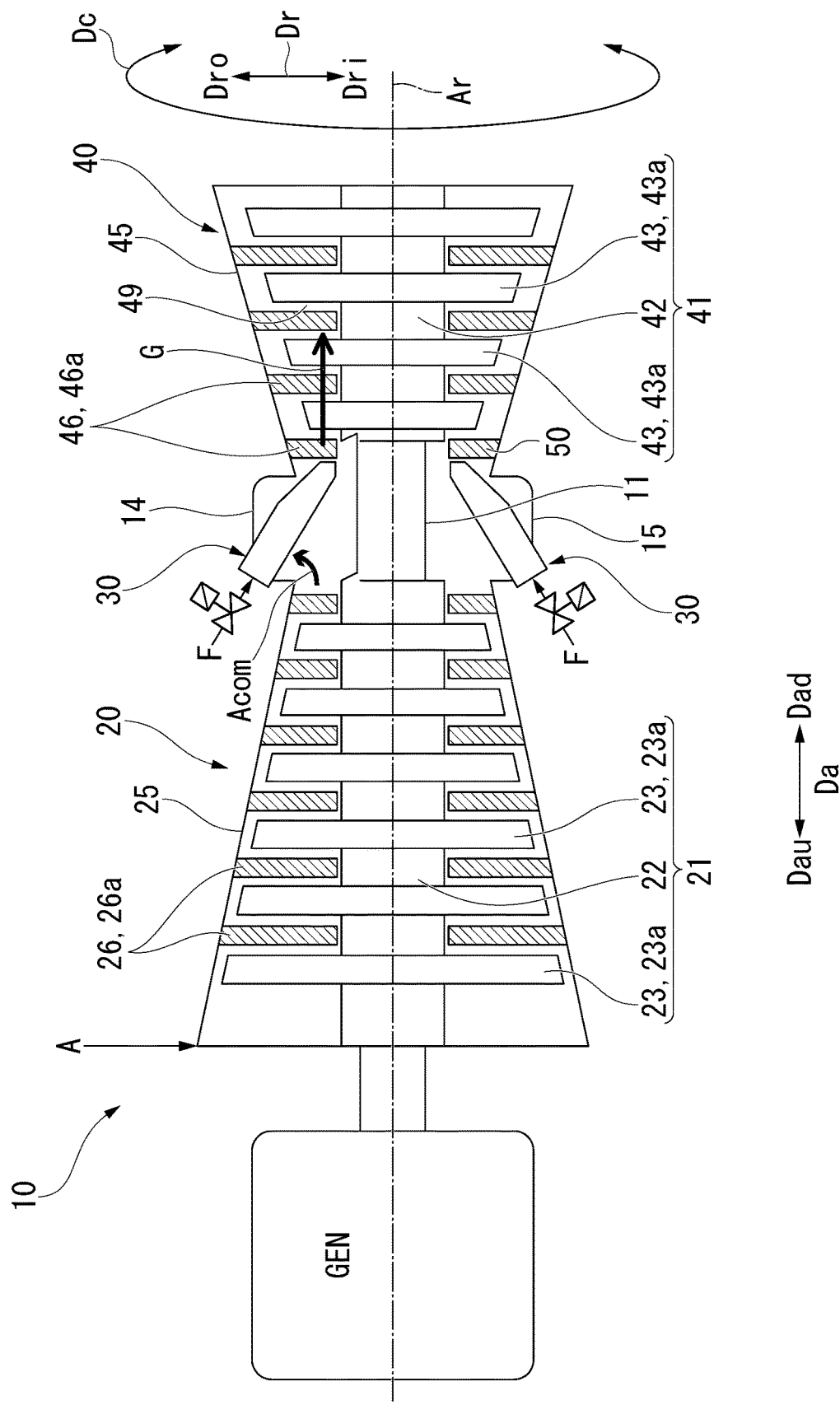
FIG. 1 is a schematic cross-sectional view of a gas turbine in an embodiment according to the present disclosure.

As illustrated in FIG. 1, a gas turbine as an embodiment according to the present disclosure includes a compressor 20 which compresses air A and generates compressed air Acom, a combustor 30 which combusts fuel F in the compressed air Acom and generates combustion gas G, and a turbine 40 which is driven by means of the combustion gas G.

The compressor 20 has a compressor rotor 21 which rotates centering on an axis Ar, a compressor casing 25 which covers the compressor rotor 21, and a plurality of turbine vane rows 26. The turbine 40 has a turbine rotor 41 which rotates centering on the axis Ar, a turbine casing 45 which covers the turbine rotor 41, and a plurality of turbine vane rows 46. Hereinafter, a direction in which the axis Ar extends will be referred to as an axial direction Da, a circumferential direction centering on this axis Ar will be simply referred to as a circumferential direction Dc, and a direction perpendicular to the axis Ar will be referred to as a radial direction Dr. In addition, one side in the axial direction Da will be referred to as an axial upstream side Dau, and a side opposite thereto will be referred to as an axial downstream side Dad. In addition, a side closer to the axis Ar in the radial direction Dr will be referred to as a radially inner side Dri, and a side opposite thereto will be referred to as a radially outer side Dro.

The gas turbine of the present embodiment further includes an intermediate casing 14. The compressor 20 is disposed on the axial upstream side Dau with respect to the turbine 40. The intermediate casing 14 is disposed between the compressor casing 25 and the turbine casing 45 in the axial direction Da. The compressor casing 25, the intermediate casing 14, and the turbine casing 45 are connected to each other and constitute a gas turbine casing 15. The combustor 30 is attached to this intermediate casing 14. The compressor rotor 21 and the turbine rotor 41 are positioned on the same axis Ar, are connected to each other, and constitute a gas turbine rotor 11. For example, a rotor of a generator GEN is connected to this gas turbine rotor 11.

The compressor rotor 21 has a rotor shaft 22 which extends in the axial direction Da centering on the axis Ar, and a plurality of turbine blade rows 23 which are attached to this rotor shaft 22. The plurality of turbine blade rows 23 are arranged in the axial direction Da. All of the turbine blade rows 23 are individually constituted of a plurality of turbine blades 23a arranged in the circumferential direction Dc. Any one turbine vane row 26 of the plurality of turbine vane rows 26 is disposed on each of the axial upstream sides Dau of the plurality of turbine blade rows 23. Each of the turbine vane rows 26 is provided on the inward side of the compressor casing 25. All of the turbine vane rows 26 are individually constituted of a plurality of turbine vanes 26a arranged in the circumferential direction Dc.

The turbine rotor 41 has a rotor shaft 42 which extends in the axial direction Da centering on the axis Ar, and a plurality of turbine blade rows 43 which are attached to this rotor shaft 42. The plurality of turbine blade rows 43 are arranged in the axial direction Da. All of the turbine blade rows 43 are individually constituted of a plurality of turbine blades 43a arranged in the circumferential direction Dc. Any one turbine vane row 46 of the plurality of turbine vane rows 46 is disposed on each of the axial upstream sides Dau of the plurality of turbine blade rows 43. Each of the turbine vane rows 46 is provided on the inward side of the turbine casing 45. All of the turbine vane rows 46 are individually constituted of a plurality of turbine vanes 46a arranged in the circumferential direction Dc.

Figure 2:
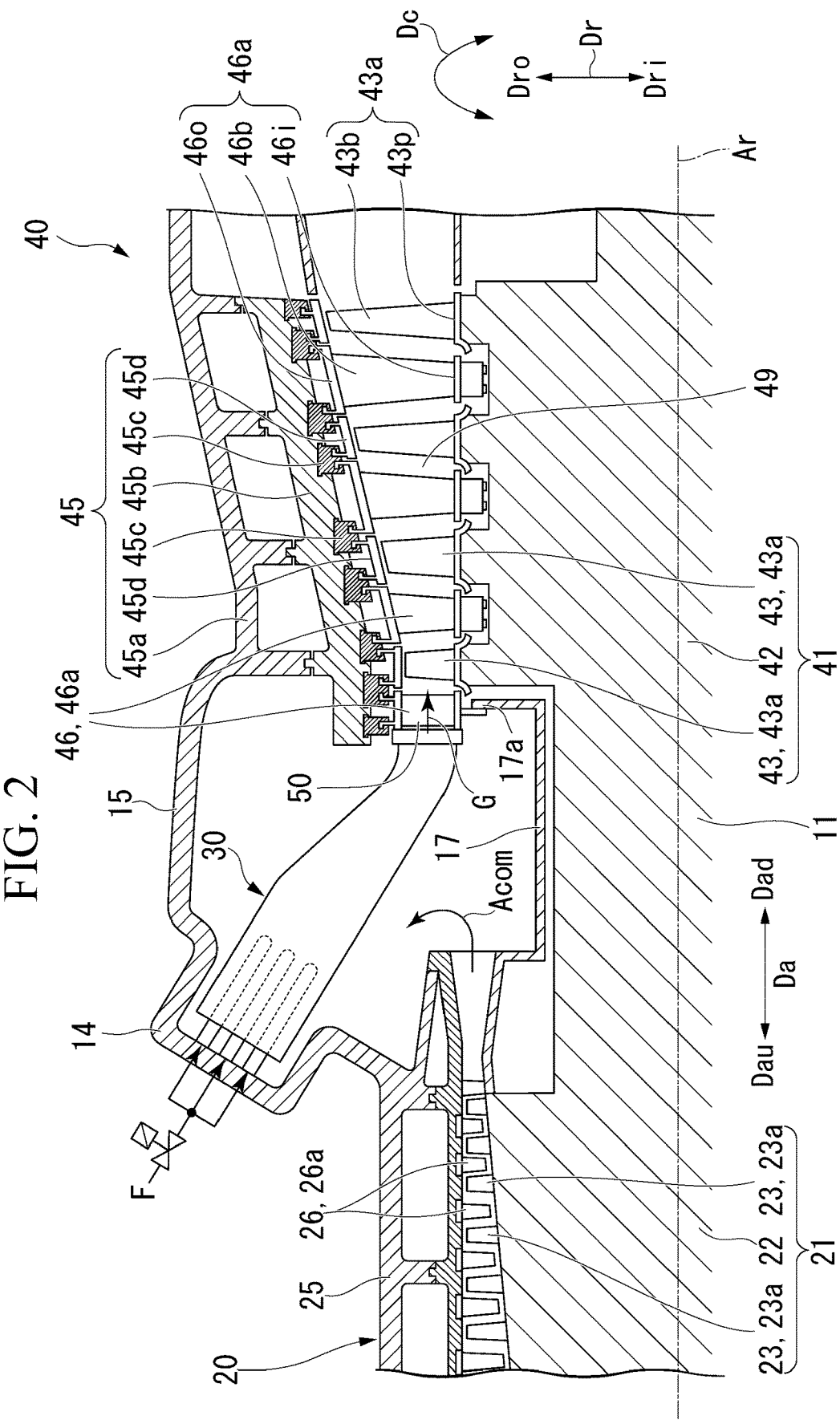
FIG. 2 is a cross-sectional view of a main part of the gas turbine in the embodiment according to the present disclosure.

As illustrated in FIG. 2, the turbine casing 45 has a tubular outer casing 45a which constitutes an outer shell thereof, an inner casing 45b which is fixed to the inward side of the outer casing 45a, a plurality of ring segments 45d which are fixed to the inward side of the inner casing 45b, and an isolation ring 45c which connects the turbine vanes 46a and the ring segments 45d to the inner casing 45b. All of the plurality of ring segments 45d are provided at positions between the plurality of turbine vane rows 46. Therefore, the turbine blade rows 43 are disposed on the radially inner side Dri with respect to the respective ring segments 45d.

A ring-shaped space which is located between an outer circumferential side of the rotor shaft 42 and an inner circumferential side of the turbine casing 45 and in which the turbine vanes 46a and the turbine blades 43a are disposed in the axial direction Da constitutes a combustion gas flow channel 49 in which the combustion gas G from the combustor 30 flows. This combustion gas flow channel 49 constitutes a ring shape centering on the axis Ar and is elongated in the axial direction Da. The combustion gas G basically flows inside this combustion gas flow channel 49 in the axial direction Da. For this reason, this axial direction Da is also referred to as a gas flowing direction. A cooling air passage (not illustrated) penetrating the inner casing 45b of the turbine casing 45 is formed therein from the radially outer side Dro to the radially inner side Dri. Cooling air passing through this cooling air passage is introduced into turbine vanes 50 and to the ring segments 45d and is used for cooling the turbine vanes 50 and the ring segments 45d. Depending on the turbine vane rows 46, air inside the gas turbine casing 15 may be supplied, as cooling air, to the turbine vanes 50 constituting these turbine vane rows 46 without passing through the cooling air passage of the turbine casing 45.

Hereinafter, an embodiment related to the turbine vanes 50 constituting the turbine vane row 46 in a first stage of the plurality of turbine vane rows 46 will be described.

Embodiment of Turbine Vane

Hereinafter, an embodiment of turbine vanes according to the present invention will be described with reference to FIGS. 3 to 10.

Figure 3:
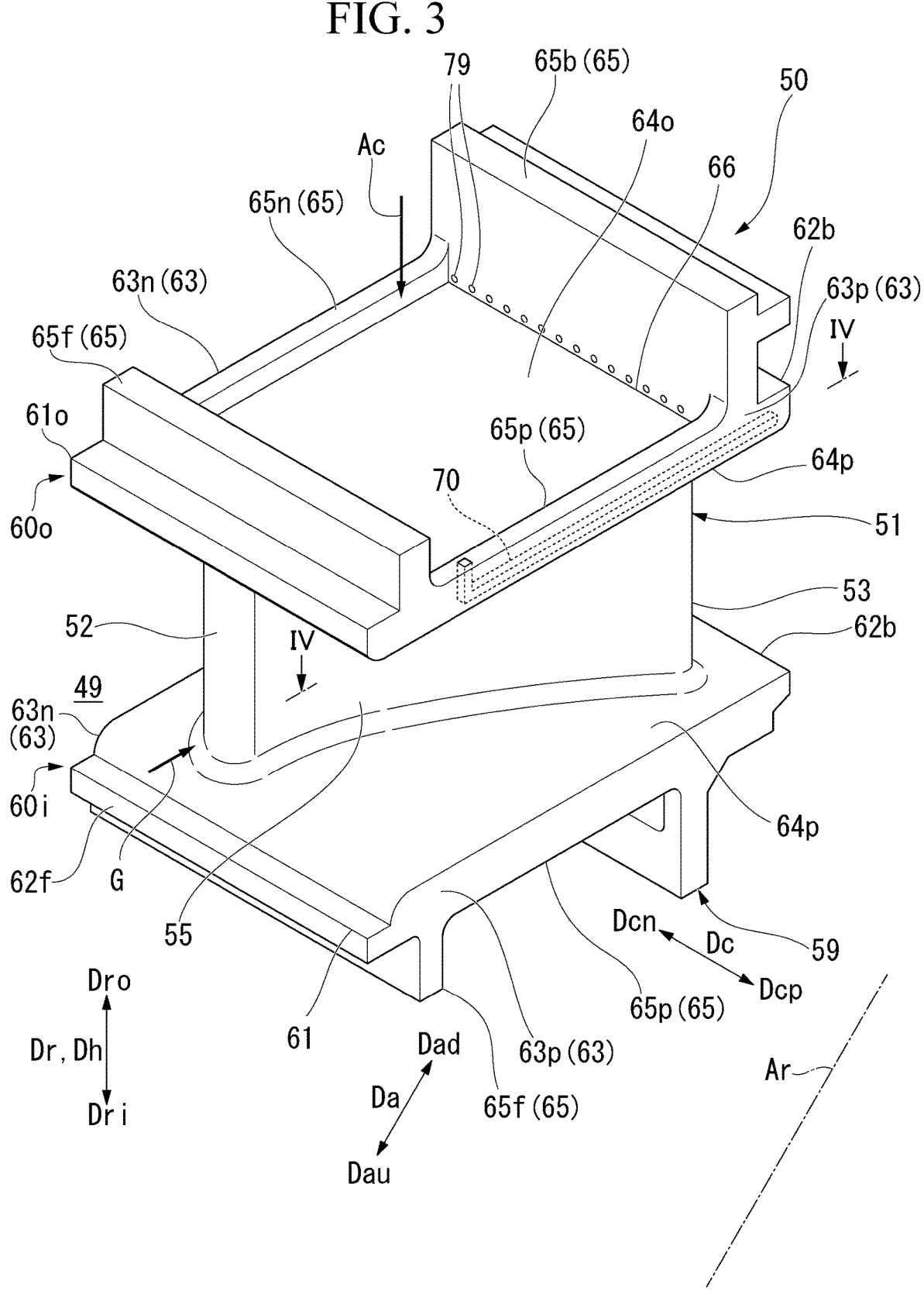
FIG. 3 is a perspective view of turbine vanes in the embodiment according to the present disclosure.

As illustrated in FIG. 3, the turbine vane 50 of the present embodiment has a blade body 51, an inner shroud 60i, an outer shroud 60o, and retainers 59. The blade body 51 has a cross-sectional shape constituting a blade profile and extends in a blade height direction Dh having a direction component perpendicular to this cross section. The inner shroud 60i is provided at an end of the blade body 51 on one side in the blade height direction Dh. The outer shroud 60o is provided at an end of the blade body 51 on the other side in the blade height direction Dh. The blade body 51, the inner shroud 60i, and the outer shroud 60o are integrally formed of a casting or the like.

In a state in which the turbine vanes 50 are attached to the turbine casing 45 (refer to FIGS. 2 and 3), the blade height direction Dh substantially becomes the radial direction Dr. In addition, one side in the blade height direction Dh becomes the radially inner side Dri, and the other side in the blade height direction Dh becomes the radially outer side Dro. For this reason, the inner shroud 60i is provided on the radially inner side Dri with respect to the blade body 51, and the outer shroud 60o is provided on the radially outer side Dro with respect to the blade body 51.

Figure 4:
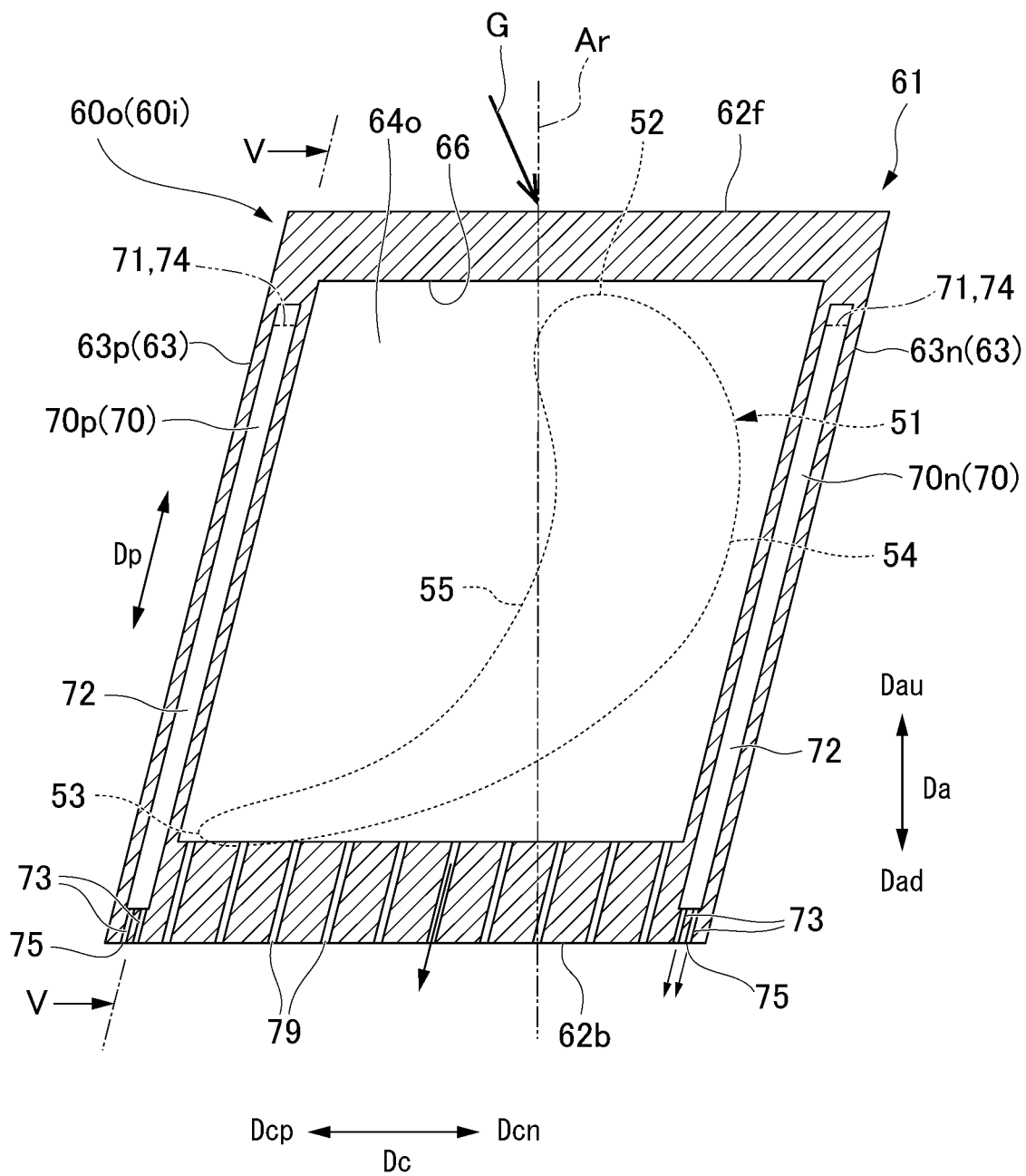
FIG. 4 is a cross-sectional view along line IV-IV in FIG. 3.

As illustrated in FIGS. 3 and 4, a blade surface that is an outer surface of the blade body 51 has a leading edge 52, a trailing edge 53, a suction side 54 that is a convex surface, and a pressure side 55 that is a concave surface. The leading edge 52 and the trailing edge 53 are present at a joint part between the suction side 54 and the pressure side 55. All of the leading edge 52, the trailing edge 53, the suction side 54, and the pressure side 55 extend in the radial direction Dr that is the blade height direction Dh. In a state in which the turbine vanes 50 are attached to the turbine casing 45, the leading edge 52 is positioned on the axial upstream side Dau with respect to the trailing edge 53. In addition, in a state in which the turbine vanes 50 are attached to the turbine casing 45, the suction side 54 faces a circumferential suction side (second lateral side) Dcn that is one side in the circumferential direction (lateral direction) Dc, and the pressure side 55 faces a circumferential pressure side (first lateral side) Dcp that is the other side in the circumferential direction Dc.

The inner shroud 60i defines an edge of the ring-shaped combustion gas flow channel 49 on the radially inner side Dri. In addition, the outer shroud 60o defines an edge of the ring-shaped combustion gas flow channel 49 on the radially outer side Dro. Thus, both the inner shroud 60i and the outer shroud 60o of the turbine vane 50 constitute flow channel forming plates.

The outer shroud 60o and the inner shroud 60i serve as flow channel forming plates, and as illustrated in FIG. 3, they each have a shroud main body 61 and a circumferential wall 65. In the shroud main body 61, a front end surface 62f that is an end surface on the axial upstream side Dau, a rear end surface 62b that is an end surface on the axial downstream side Dad, a pair of lateral end surfaces 63 which face sides opposite to each other in the circumferential direction Dc, a gas path surface 64p which comes into contact with the combustion gas G, and an opposite gas path surface 64o which faces a side opposite to the gas path surface 64p are formed. In the pair of lateral end surfaces 63, an end surface on the circumferential pressure side (first lateral side) Dcp constitutes a pressure side end surface (first lateral end surface) 63p, and an end surface on the circumferential suction side (second lateral side) Dcn constitutes a suction side end surface (second lateral end surface) 63n. The front end surface 62f and the rear end surface 62b are approximately parallel to each other. In addition, the pressure side end surface 63p and the suction side end surface 63n are approximately parallel to each other. Thus, when viewed in the radial direction Dr, as illustrated in FIG. 4, the shroud main body 61 constitutes a parallelogram shape.

Here, a side where the gas path surface 64p is present with respect to the opposite gas path surface 64o is referred to as a gas path side Drp, and a side where the opposite gas path surface 64o is present with respect to the gas path surface 64p is referred to as an opposite gas path side Dra. The opposite gas path side Dra of the outer shroud 60o is the radially outer side Dro, and the gas path side Drp of the outer shroud 60o is the radially inner side Dri. In addition, the opposite gas path side Dra of the inner shroud 60i is the radially inner side Dri, and the gas path side Drp of the inner shroud 60i is the radially outer side Dro.

The circumferential wall 65 protrudes from the opposite gas path surface 64o to the opposite gas path side Dra. This circumferential wall 65 has a front wall 65f and a rear wall 65b facing each other in the axial direction Da, and a pair of side walls 65p and 65n facing each other in the circumferential direction Dc. In the pair of side walls 65p and 65n, a side wall on the circumferential pressure side Dcp constitutes the pressure side wall 65p, and a side wall on the circumferential suction side Dcn constitutes the suction side wall 65n. Both the front wall 65f and the rear wall 65b protrude to the opposite gas path side Dra beyond the pair of side walls 65p and 65n with respect to the shroud main body 61. In the outer shroud 60o and the inner shroud 60i, a recessed portion 66 recessed toward the gas path side Drp is formed by the shroud main body 61 and the circumferential wall 65. A surface of the pressure side wall 65p on the circumferential pressure side Dcp and a surface of the shroud main body 61 on the circumferential pressure side Dcp are flush with each other. In addition, a surface of the suction side wall 65n on the circumferential suction side Dcn and a surface of the shroud main body 61 on the circumferential suction side Dcn are flush with each other.

The retainers 59 protrude from the pair of side walls 65p and 65n of the inner shroud 60i to the opposite gas path side Dra (radially inner side Dri). These retainers 59 are positioned between the front wall 65f and the rear wall 65b in the axial direction Da and are formed from the pressure side end surface 63p to the suction side end surface 63n. The pressure side end surfaces of the retainers 59 are flush with the pressure side end surface 63p of an inner shroud main body 61i. In addition, although it is not illustrated, the suction side end surfaces of the retainers 59 are flush with the suction side end surface 63n of the inner shroud main body 61i. As illustrated in FIG. 2, these retainers 59 come into contact with a radially outer end 17a of an inner cover 17 on the axial downstream side Dad fixed to the gas turbine casing 15 and play a role for supporting a part of the turbine vane 50 on the radially inner side Dri at the radially outer end 17a of the inner cover 17.

As illustrated in FIG. 4, the outer shroud 60o and the inner shroud 60i further have a pair of lateral passages 70, which are formed between the gas path surface 64p and the opposite gas path surface 64o and in which cooling air flows, and a plurality of rear end injection passages 79. Incidentally, as described above, the foregoing retainers 59 are provided in the inner shroud 60i, and the inner shroud 60i and the outer shroud 60o differ from each other in that members corresponding to the retainers 59 are not provided in the outer shroud 60o. However, basically, the constitutions of the inner shroud 60i and the outer shroud 60o are otherwise the same as each other. For this reason, hereinafter, the outer shroud 60o will be described.

One lateral passage 70 of the pair of lateral passages 70 constitutes a pressure side passage (first lateral passage) 70p, and the other lateral passage 70 thereof constitutes a suction side passage (second lateral passage) 70n. The pressure side passage 70p lies along the pressure side end surface (first lateral end surface) 63p, and the suction side passage 70n lies along the suction side end surface (second lateral end surface) 63n.

All of the plurality of rear end injection passages 79 penetrate the rear end surface 62b from a surface defining the recessed portion 66. The plurality of rear end injection passages 79 are arranged between the pressure side passage 70p and the suction side passage 70n in the circumferential direction (lateral direction) Dc.

Figure 5:
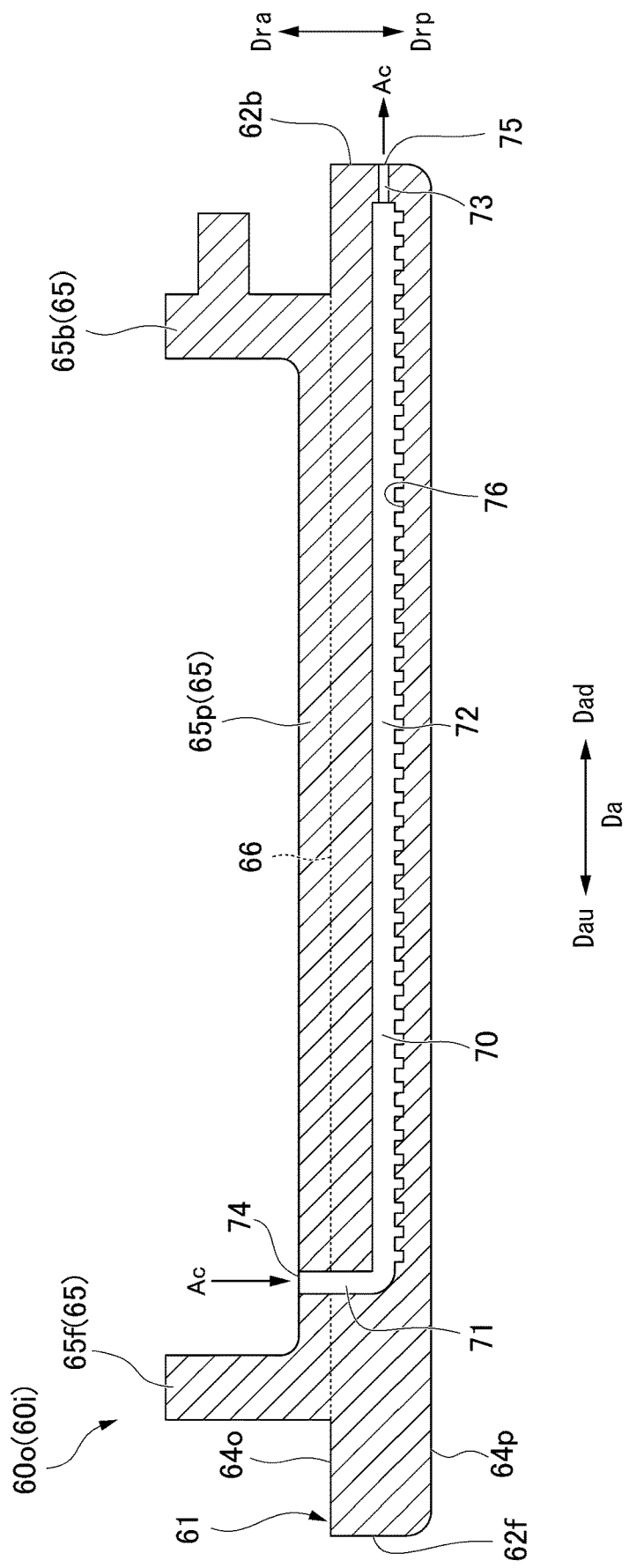
FIG. 5 is a cross-sectional view along line V-V in FIG. 4.

As illustrated in FIGS. 3 to 5, each of the pressure side passage 70p and the suction side passage 70n has an inlet passage portion 71, a main passage portion 72, and two narrow passage portions 73.

The main passage portion 72 of the pressure side passage 70p extends in a direction in which the pressure side end surface 63p extends along the gas path surface 64p and the pressure side end surface 63p. The inlet passage portion 71 of the pressure side passage 70p extends from an end of the main passage portion 72 on the axial upstream side Dau to the opposite gas path side Dra and opens on a surface facing the opposite gas path side Dra of the pressure side wall 65p. This opening serves an inlet 74 for cooling air of the pressure side passage 70p. Both the two narrow passage portions 73 extend from an end of the main passage portion 72 on the axial downstream side Dad toward the rear end surface 62b and open on the rear end surface 62b. These openings serve as an outlet 75 for cooling air of the pressure side passage 70p. These are the only openings of the outlet 75 for cooling air in the pressure side passage 70p. The opening of the inlet passage portion 71, namely, the area of the inlet 74 is substantially the same as a cross-sectional area of the main passage portion 72. In addition, the total area of the openings of the two narrow passage portions 73, namely, the total area of the outlet 75 is smaller than the cross-sectional area of the main passage portion 72.

The main passage portion 72 of the suction side passage 70n extends in a direction in which the suction side end surface 63n extends along the gas path surface 64p and the suction side end surface 63n. The inlet passage portion 71 of the suction side passage 70n extends from the end of the main passage portion 72 on the axial upstream side Dau to the opposite gas path side Dra and opens on a surface facing the opposite gas path side Dra of the suction side wall 65n. This opening serves as an inlet 74 for cooling air of the suction side passage 70n. Both the two narrow passage portions 73 extend from an end of the main passage portion 72 on the axial downstream side Dad toward the rear end surface 62b and open on the rear end surface 62b. These openings serve as an outlet 75 for cooling air of the suction side passage 70n. These are the only openings of the outlet 75 for cooling air in the suction side passage 70n. The opening of the inlet passage portion 71, namely, the area of the inlet 74 is substantially the same as the cross-sectional area of the main passage portion 72. In addition, the total area of the openings of the two narrow passage portions 73, namely, the total area of the outlet 75 is smaller than the cross-sectional area of the main passage portion 72.

The two narrow passage portions 73 of the pressure side passage 70p extend in a passage extension direction Dp in which the main passage portion 72 of the pressure side passage 70p extends. In addition, the two narrow passage portions 73 of the suction side passage 70n also extend in the passage extension direction Dp in which the main passage portion 72 of the suction side passage 70n extends. In the present embodiment, the passage extension direction Dp in which the main passage portion 72 of the pressure side passage 70p extends and the passage extension direction Dp in which the main passage portion 72 of the suction side passage 70n extends are the same direction. In addition, this passage extension direction Dp and a direction in which the lateral end surfaces 63 extend are the same direction.

Figure 6:
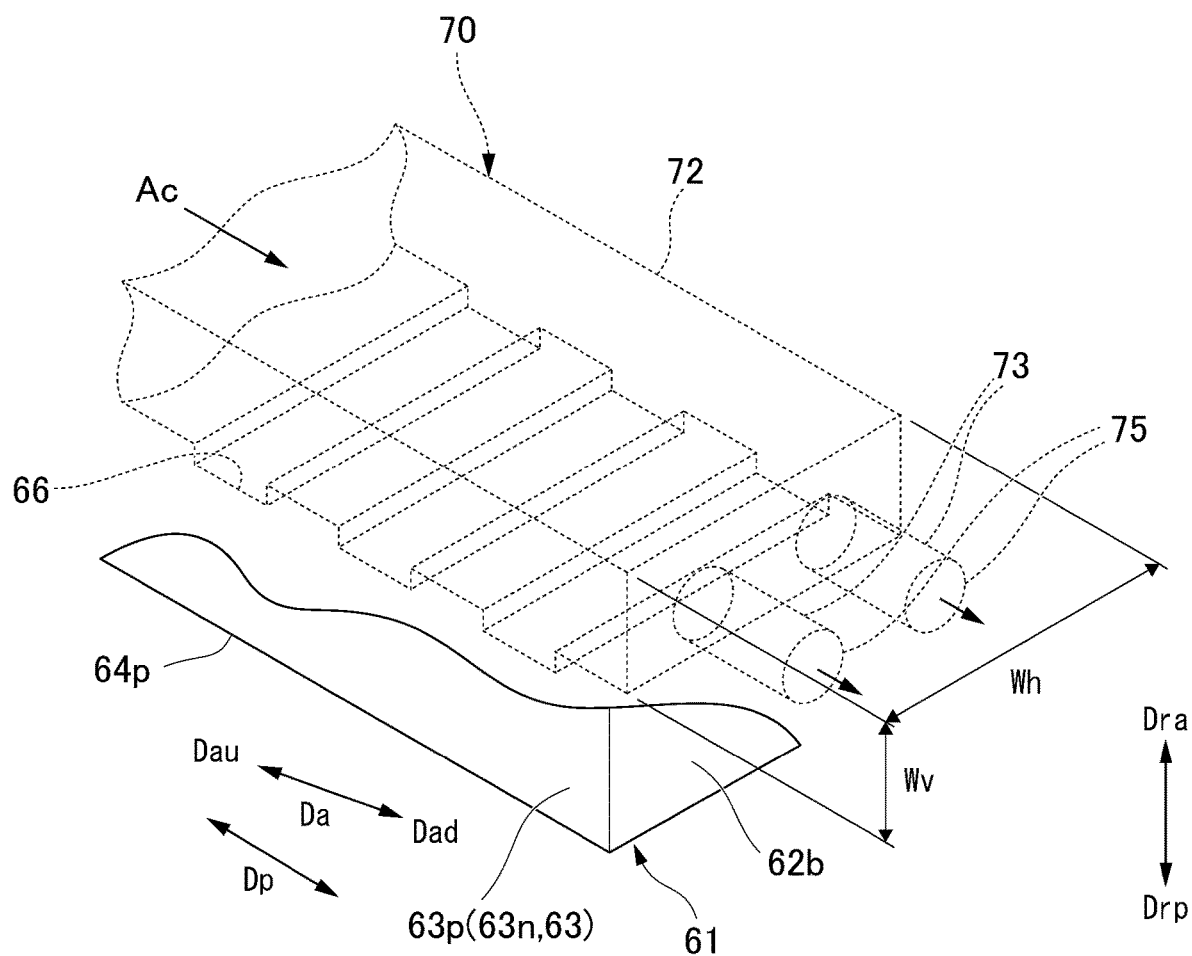
FIG. 6 in the embodiment according to the present disclosure is a perspective view of a main part of a lateral passage.

As illustrated in FIG. 6, a horizontal width Wh of each of the main passage portions 72 of the pressure side passage 70p and the suction side passage 70n is larger than a vertical width Wv of each of the main passage portions 72 of the pressure side passage 70p and the suction side passage 70n. Here, the horizontal width Wh is a width in a direction perpendicular to the passage extension direction Dp and parallel to the gas path surface 64p. In addition, the vertical width Wv is the width in a direction perpendicular to the passage extension direction Dp and perpendicular to the gas path surface 64p.

In each of the main passage portions 72 of the pressure side passage 70p and the suction side passage 70n, a surface facing the opposite gas path side Dra, of surfaces defining a space inside the main passage portion 72, is an uneven surface 76 on which unevenness is repeated in the passage extension direction Dp. Thus, this uneven surface 76 functions as a turbulator for cooling air flowing in the main passage portion 72.

Figure 7:
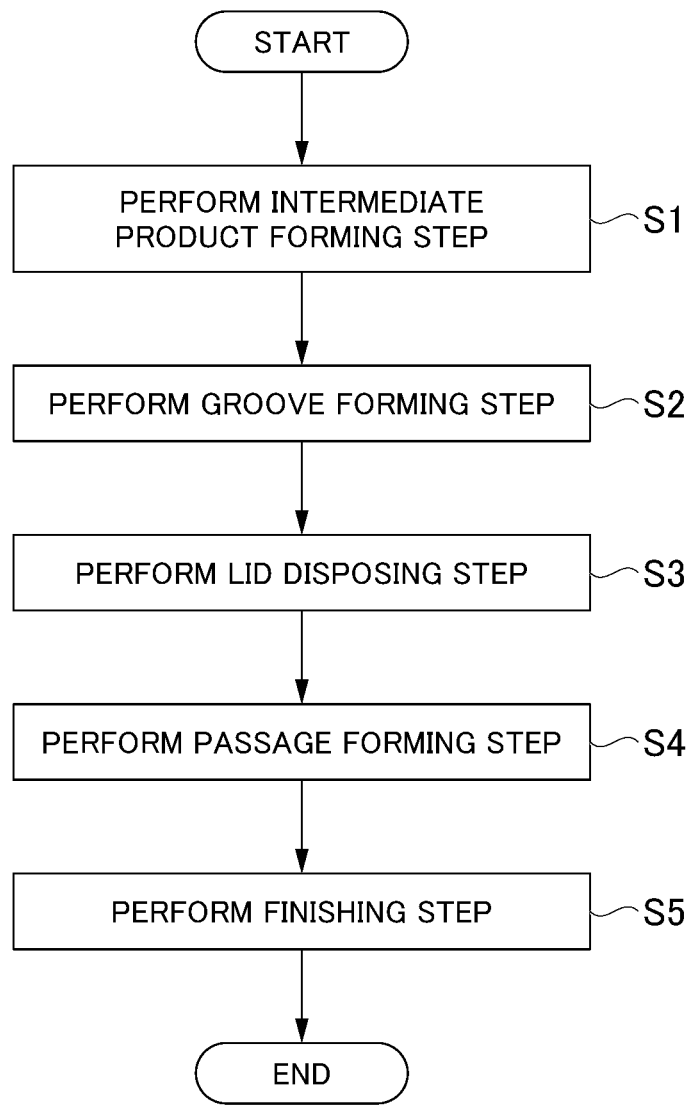
FIG. 7 is a flowchart showing a procedure of manufacturing a flow channel forming plate in the embodiment according to the present disclosure.

Next, in accordance with the flowchart shown in FIG. 7, a procedure of manufacturing the flow channel forming plate (the outer shroud 60o or the inner shroud 60i) described above will be described.

Figure 8:
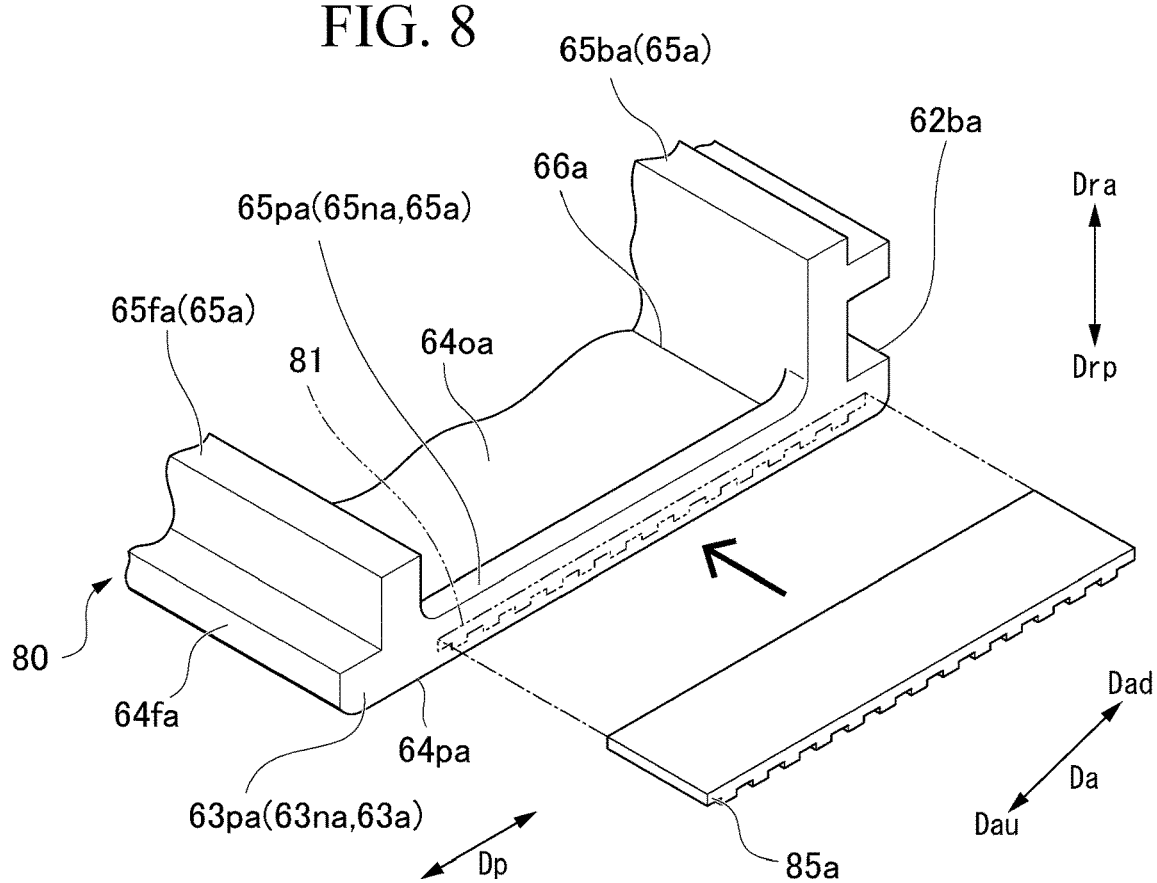
FIG. 8 is an explanatory diagram illustrating an intermediate product forming step and a groove forming step in the embodiment according to the present disclosure.

First, as illustrated in FIG. 8, an intermediate product 80 matching the external shape of the flow channel forming plate is formed (S1: intermediate product forming step). In this intermediate product forming step (S1), first, a die having an internal space matching the external shape of the flow channel forming plate formed therein is formed. For example, the die is formed by a lost wax method. Next, molten metal is poured into the die. At this time, when there is a need to form a space inside the intermediate product 80, molten metal is poured after a core matching the shape of this space is set inside the die. When the molten metal is cured, the intermediate product 80 is brought to completion.

When a core is set inside the die, molten metal is cured, and then this core is melted using a chemical agent. In this intermediate product 80, a gas path surface 64pa, an opposite gas path surface 64oa, and various end surfaces 62fa, 62ba, and 63a (63pa and 63na) as well as an outer surface of a circumferential wall 65a and the like are formed. However, the gas path surface 64pa, the opposite gas path surface 64oa, and the various end surfaces 62fa, 62ba, and 63a (63pa and 63na) as well as the outer surface of the circumferential wall 65a and the like in this intermediate product 80 differ from the gas path surface 64p, the opposite gas path surface 64o, and various end surfaces 62f, 62b, and 63 (63p and 63n) as well as the outer surface of the circumferential wall 65 and the like in the flow channel forming plate (finished product), which will be described below. In addition, the intermediate product 80 formed in this intermediate product forming step (S1) has a flow channel forming plate and a blade body integrated with this flow channel forming plate.

Figure 9:
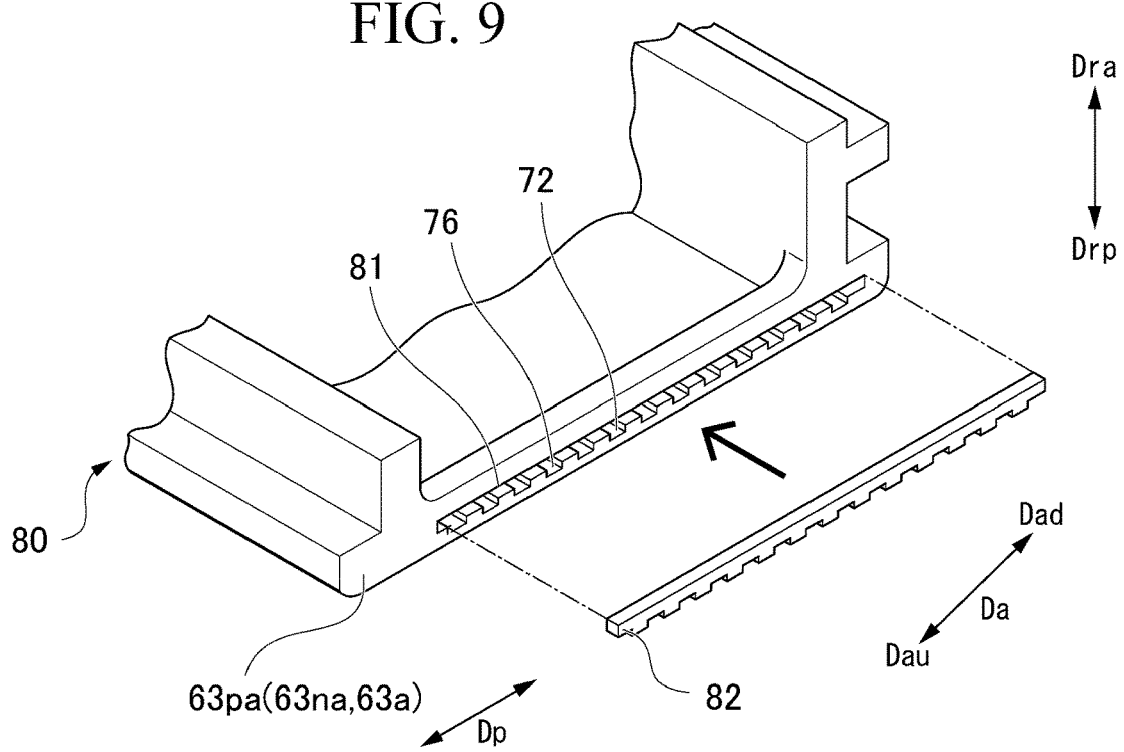
FIG. 9 is an explanatory diagram illustrating a lid disposing step in the embodiment according to the present disclosure.

Next, as illustrated in FIGS. 8 and 9, a groove 81 is formed in each of the pressure side end surface (first lateral end surface) 63pa and the suction side end surface (second lateral end surface) 63na of the intermediate product 80 by electrochemical machining (S2: groove forming step). In this electrochemical machining, a first electrode 85a matching the shape of a target groove is prepared. Further, the groove 81 on the side on the pressure side end surface 63p is formed by moving this first electrode 85a to a side on the suction side end surface 63n from the pressure side end surface 63p, and the groove 81 on the suction side end surface 63n is formed by moving this first electrode 85a to a side on the pressure side end surface 63p from the suction side end surface 63n. None of these grooves 81 is formed at a part on the axial upstream side Dau and a part on the axial downstream side Dad on each of the lateral end surfaces 63a. Namely, in this groove forming step (S2), the groove 81 recessed in a direction perpendicular to this lateral end surface 63a from the lateral end surface 63a and extending in a direction in which the lateral end surface 63a extends (passage extension direction Dp) is formed within the lateral end surface 63a avoiding a part on the axial upstream side Dau and a part on the axial downstream side Dad. A surface facing the opposite gas path side Dra, of surfaces defining this groove 81, is the uneven surface 76 on which unevenness is repeated in the passage extension direction Dp. The space inside this groove 81 forms the main passage portion 72.

Next, as illustrated in FIG. 9, an opening of the groove 81 is blocked by a lid member 82, and the main passage portion 72 extending in a direction in which the lateral end surface 63a extends (passage extension direction Dp) is formed along the lateral end surface 63a by the groove 81 and the lid member 82 (S3: lid disposing step).

Figure 10:
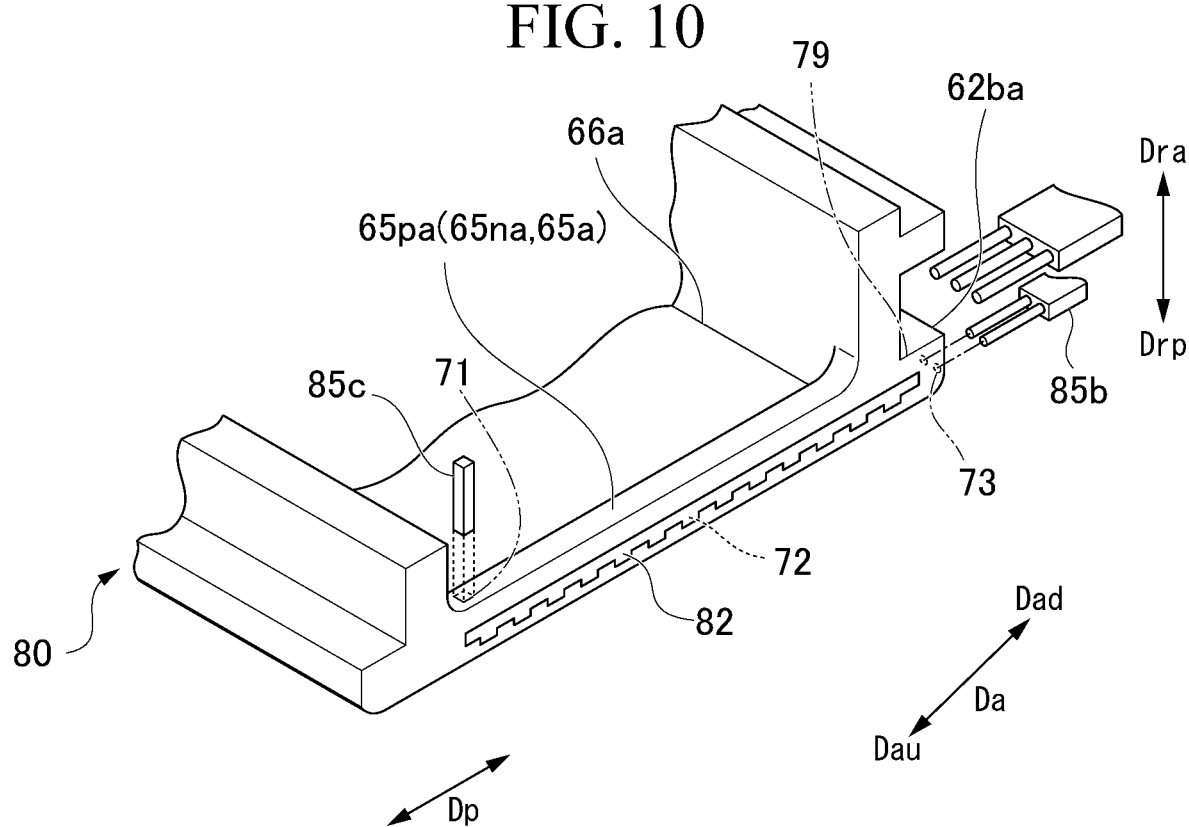
FIG. 10 is an explanatory diagram illustrating a passage forming step in the embodiment according to the present disclosure.

Next, as illustrated in FIG. 10, the two narrow passage portions 73 which penetrate the inside of the main passage portion 72 from the rear end surface 62ba of the intermediate product 80, the inlet passage portions 71 which penetrate the insides of the main passage portions 72 from a surface facing the opposite gas path side Dra in side walls 65pa and 65na of the intermediate product 80, and the plurality of rear end injection passages 79 penetrating the insides of recessed portions 66a of the intermediate product 80 from the rear end surface 62ba are formed (S4: passage forming step). In this groove forming step (S4), the two narrow passage portions 73 are formed using a second electrode 85b matching the shapes of the two narrow passage portions 73 by electrochemical machining. In addition, the inlet passage portion 71 is formed using a third electrode 85c matching the shape of the inlet passage portion 71 by electrochemical machining. Moreover, the plurality of rear end injection passages 79 is formed using a fourth electrode 85d matching the shape of the plurality of rear end injection passages 79 by electrochemical machining. The pair of lateral passages 70 and the plurality of rear end injection passages 79 are formed by executing this passage forming step (S4).

Last, the outer surface of the intermediate product 80 is polished by mechanical working or the like. In addition, as necessary, the outer surface of the intermediate product 80 is subjected to heat-resistant coating (S5: finishing step). The gas path surface 64p, the opposite gas path surface 64o, and various end surfaces 62f, 62b, and 63 (63p and 63n) as well as the outer surface of the circumferential wall 65 and the like in the flow channel forming plate are ultimately formed by executing this finishing step (S5), and this flow channel forming plate is brought to completion.

Hereinabove, after the lid disposing step (S3) is executed, the two narrow passage portions 73, the inlet passage portions 71, and the plurality of rear end injection passages 79 are formed. However, the two narrow passage portions 73, the inlet passage portions 71, and the plurality of rear end injection passages 79 may be formed before the lid disposing step (S3) is executed. In addition, hereinabove, the groove 81, each of the passage portions 71 and 73, and the rear end injection passages 79 are formed by electrochemical machining, but they may be processed by other machining methods such as mechanical working and electrical discharge machining.

A part of the compressed air Acom generated by the compressor 20 is supplied to the flow channel forming plate of the present embodiment as cooling air Ac. The flow channel forming plate of the present embodiment is cooled by this cooling air Ac.

Since the lateral passages 70 of the present embodiment each have one or more narrow passage portions 73, compared to a case of having no narrow passage portions 73, the flow rate of the cooling air Ac passing through these lateral passages 70 can be curbed.

In addition, in the present embodiment, compared to a case in which the cross-sectional area at each of positions in the lateral passage 70 between the inlet 74 for the cooling air Ac and the outlet 75 for the cooling air Ac is the same, the cross-sectional area in the main passage portion 72 can be increased. For this reason, when the lateral passage 70 is projected onto the gas path surface 64p from the opposite gas path side Dra, the projection area of the lateral passage 70 within the gas path surface 64p can be expanded. Moreover, in the present embodiment, the horizontal widths Wh of the main passage portions 72 are larger than the vertical widths Wv of the main passage portions 72, and then a plurality of narrow passage portions 73 are arranged in a direction parallel to the gas path surface 64p. Thus, in the present embodiment, due to the lateral passages 70, the gas path surface 64p can be cooled over a wide range.

In the present embodiment, the uneven surface 76 of the main passage portion 72 functions as a turbulator for the cooling air Ac flowing in the main passage portion 72. For this reason, in the present embodiment, a turbulent flow of the cooling air Ac is generated in a region along the uneven surface 76 inside the main passage portion 72, and thus heat exchanging performance between the cooling air Ac and the flow channel forming plate can be enhanced.

Modification Example

As illustrated in FIG. 2, similar to the turbine vanes 50 constituting the turbine vane row in the first stage, the turbine vanes 46a constituting the turbine vane rows 46 after the turbine vane row in a second stage have a blade body 46b, an inner shroud 46i, and an outer shroud 46o. Thus, similar to those above, lateral passages may also be formed in the inner shroud 46i and the outer shroud 46o of the turbine vanes 46a constituting the turbine vane rows 46 after the turbine vane row in the second stage.

As illustrated in FIG. 2, the turbine blades 43a of the turbine 40 have a blade body 43b extending in the radial direction Dr, and a platform 43p formed on the radially inner side Dri with respect to the blade body. This blade body 43b is disposed inside the combustion gas flow channel 49 through which the combustion gas G passes. The platform 43p defines a position of the ring-shaped combustion gas flow channel 49 on the radially inner side Dri. In addition, the ring segment 45d disposed on the radially outer side Dro with respect to this turbine blade 43a defines a position of the ring-shaped combustion gas flow channel 49 on the radially outer side Dro. Thus, both the platform 43p and the ring segment 45d of the turbine blade 43a constitute flow channel forming plates. Hence, similar to those above, lateral passages may be formed in the platform 43p and the ring segment 45d constituting these flow channel forming plates.

In the foregoing embodiments, two narrow passage portions 73 are provided with respect to one main passage portion 72. However, only one narrow passage portion 73 may be provided or three or more narrow passage portions 73 may be provided with respect to one main passage portion 72.

In the foregoing embodiments, the inlets 74 of the lateral passages 70 are formed on surfaces facing the opposite gas path side Dra in the side walls 65p and 65n. However, openings may be formed on the surface defining the recessed portion 66, and these openings may serve as the inlets 74 of the lateral passages 70.

Hereinabove, the embodiments according to the present disclosure and modification examples thereof have been described in detail with reference to the drawings. However, specific constitutions of the embodiments according to the present invention are not limited to the embodiments and the modification examples thereof as long as they are within the scope described in each of the claims described in what is claimed in this application.

APPENDIX

The flow channel forming plate according to the foregoing embodiment is ascertained as follows, for example.

(1) According to a first aspect, there is provided a flow channel forming plate defining a combustion gas flow channel 49 in which combustion gas G flows in a gas turbine. The flow channel forming plate has a gas path surface 64p which comes into contact with the combustion gas G, an opposite gas path surface 64o which faces a side opposite to the gas path surface 64p, an end surface which is formed at a circumferential edge on the gas path surface 64p, and one or more lateral passages 70 which are formed between the gas path surface 64p and the opposite gas path surface 64o and in which cooling air Ac flows. The end surface has a rear end surface 62b facing a downstream side Dad where the combustion gas G flows, a front end surface 62f facing an upstream side Dau on a side opposite to the downstream side Dad and having a back-to-back relationship with the rear end surface 62b, and a lateral end surface 63 facing a side in a lateral direction Dc perpendicular to a gas flowing direction Da in which the rear end surface 62b and the front end surface 62f are arranged. The one or more lateral passages 70 have, along the gas path surface 64p and the lateral end surface 63, a main passage portion 72 extending in a direction in which the lateral end surface 63 extends, and one or more narrow passage portions 73 extending from an end of the main passage portion 72 on the downstream side Dad toward the rear end surface 62b and opening on the rear end surface 62b. The area of an opening in the one or more narrow passage portions 73 on the rear end surface 62b is smaller than a cross-sectional area of the main passage portion.

In the present aspect, since the lateral passage 70 has one or more narrow passage portions 73, compared to a case of having no narrow passage portions 73, the flow rate of the cooling air Ac passing through this lateral passage 70 can be curbed. In addition, in the present aspect, compared to a case in which the cross-sectional area at each of positions in the lateral passage 70 between an inlet 74 for the cooling air Ac and an outlet 75 for the cooling air Ac is the same, the cross-sectional area in the main passage portion 72 can be increased. For this reason, when the lateral passage 70 is projected onto the gas path surface 64p from an opposite gas path side Dra, a projection area of the lateral passage 70 within the gas path surface 64p can be expanded, and the gas path surface 64p can be cooled over a wide area.

(2) According to the flow channel forming plate of a second aspect, in the flow channel forming plate according to the first aspect, the lateral end surface 63 has a first lateral end surface 63p facing a first lateral side Dcp and a second lateral end surface 63n facing a second lateral side Dcn, of the first lateral side Dcp that is one side in the lateral direction Dc and the second lateral side Dcn that is the other side therein. The one or more lateral passages 70 have a first lateral passage 70p and a second lateral passage 70n. The first lateral passage 70p lies along the first lateral end surface 63p. The second lateral passage 70n lies along the second lateral end surface 63n.

(3) According to the flow channel forming plate of a third aspect, the flow channel forming plate according to the second aspect further includes a circumferential wall 65 which is provided along the end surface, and a plurality of rear end injection passages 79. The circumferential wall 65 protrudes to an opposite gas path side Dra from the opposite gas path surface 64o, of a gas path side Drp that is a side where the gas path surface 64p is present with respect to the opposite gas path surface 64o and the opposite gas path side Dra where the opposite gas path surface 64o is present with respect to the gas path surface 64p. The opposite gas path surface 64o and the circumferential wall 65 form a recessed portion 66 which is recessed on the gas path side Drp and into which the cooling air Ac flows. All of the plurality of rear end injection passages 79 penetrate a surface defining the recessed portion 66 from the rear end surface 62b. The plurality of rear end injection passages 79 are arranged in the lateral direction Dc between the first lateral passage 70p and the second lateral passage 70n.

Within the gas path surface 64p of the flow channel forming plate, the area between the first lateral passage 70p and the second lateral passage 70n on the downstream side Dad of the recessed portion 66 and on the lateral direction Dc can be cooled by the cooling air Ac flowing in the plurality of rear end injection passages 79.

(4) According to the flow channel forming plate of a fourth aspect, in the flow channel forming plate according to any one of the first aspect to the third aspect, the one or more narrow passage portions 73 have a plurality of narrow passage portions 73. The plurality of narrow passage portions 73 are arranged in a direction parallel to the gas path surface 64p.

In the present aspect, since the plurality of narrow passage portions 73 are arranged in a direction parallel to the gas path surface 64p on the downstream side Dad of the main passage portion 72, a part within the gas path surface 64p and on the downstream side Dad of the main passage portion 72 can be cooled over a wide range.

(5) According to the flow channel forming plate of a fifth aspect, in the flow channel forming plate according to any one of the first aspect to the fourth aspect, the one or more narrow passage portions 73 extend in the same direction as a passage extension direction Dp in which the main passage portion 72 extends.

(6) According to a sixth aspect, there is provided a flow channel forming plate defining a combustion gas flow channel in which combustion gas G flows in a gas turbine. The flow channel forming plate has a gas path surface 64p which comes into contact with the combustion gas G, an opposite gas path surface 64o which faces a side opposite to the gas path surface 64p, an end surface which is formed at a circumferential edge on the gas path surface 64p, and one or more lateral passages 70 which are formed between the gas path surface 64p and the opposite gas path surface 64o. The one or more lateral passages 70 have a main passage portion 72 extending toward a part on the end surface along the gas path surface 64p, and a plurality of narrow passage portions 73 extending from an end of the main passage portion 72 to a part on the end surface and opening at a part on the end surface. All of the plurality of narrow passage portions 73 extend in a passage extension direction Dp in which the main passage portion 72 extends. The plurality of narrow passage portions 73 are arranged in a direction parallel to the gas path surface 64p. A total area of openings at parts on the end surfaces in the plurality of respective narrow passage portions 73 is smaller than a cross-sectional area of the main passage portion 72.

In the present aspect, since the lateral passage 70 has the plurality of narrow passage portions 73, compared to a case of having no narrow passage portions 73, the flow rate of the cooling air Ac passing through this lateral passage 70 can be curbed. In addition, in the present aspect, compared to a case in which the cross-sectional area at each of positions in the lateral passage 70 between an inlet 74 for the cooling air Ac and an outlet 75 for the cooling air Ac is the same, the cross-sectional area in the main passage portion 72 can be increased. For this reason, when the lateral passage 70 is projected onto the gas path surface 64p from the opposite gas path side Dra, a projection area of the lateral passage 70 within the gas path surface 64p can be expanded. Moreover, in the present aspect, a plurality of narrow passage portions 73 are arranged in a direction parallel to the gas path surface 64p. Thus, due to the lateral passage 70 of the present aspect, the gas path surface 64p can be cooled over a wide range.

(7) According to the flow channel forming plate of a seventh aspect, in the flow channel forming plate according to the fifth aspect or the sixth aspect, a width Wh of the main passage portion 72 in a direction perpendicular to the passage extension direction Dp and parallel to the gas path surface 64p is larger than a width Wh of the main passage portion 72 in a direction perpendicular to the passage extension direction Dp and perpendicular to the gas path surface 64p.

In the present aspect, when the lateral passage 70 is projected onto the gas path surface 64p from the opposite gas path side Dra, the projection area of the lateral passage 70 within the gas path surface 64*p* can be expanded.

(8) According to the flow channel forming plate of an eighth aspect, in the flow channel forming plate according to any one of the fifth aspect to the seventh aspect, a surface facing a side opposite to the gas path surface 64*p* in the main passage portion 72, of surfaces defining a space inside the main passage portion 72, is an uneven surface 76 on which unevenness is repeated in the passage extension direction Dp.

In the present aspect, the uneven surface 76 of the main passage portion 72 functions as a turbulator with respect to the cooling air Ac flowing in the main passage portion 72. For this reason, in the present aspect, a turbulent flow of the cooling air Ac is generated in a region along the uneven surface 76 inside the main passage portion 72, and thus heat exchanging performance between the cooling air Ac and the flow channel forming plate can be enhanced.

(9) According to the flow channel forming plate of a ninth aspect, in the flow channel forming plate according to any one of the first aspect to the eighth aspect, the one or more lateral passages 70 have only the openings in the one or more lateral passages 73 as outlets for the cooling air Ac which has flowed through the one or more narrow passage portions 70.

The blade according to the foregoing embodiment is ascertained as follows, for example.

(10) According to a tenth aspect, there is provided a blade including the flow channel forming plate according to any one of the first aspect to the ninth aspect, and a blade body 51 which extends from the gas path surface 64*p* in a blade height direction Dh having a direction component perpendicular to the gas path surface 64*p* and of which a cross-sectional shape perpendicular to the blade height direction Dh constitutes a blade profile.

The gas turbine according to the foregoing embodiment is ascertained as follows, for example.

(11) According to an eleventh aspect, there is provided a gas turbine including a combustor 30 which is configured to generate combustion gas G, and a turbine 40 which is configured to be driven by means of the combustion gas G. The turbine 40 has the flow channel forming plate according to any one of the first aspect to the ninth aspect.

The method of manufacturing a flow channel forming plate according to the foregoing embodiment is ascertained as follows, for example.

(12) According to a twelfth aspect, there is provided a method of manufacturing a flow channel forming plate defining a combustion gas flow channel in which combustion gas G flows in a gas turbine, for executing an intermediate product forming step S1, a groove forming step S2, a lid disposing step S3, and a passage forming step S4. In the intermediate product forming step S1, an intermediate product 80 having a gas path surface 64*pa* which comes into contact with the combustion gas G, an opposite gas path surface 64*oa* which faces a side opposite to the gas path surface 64*pa*, and an end surface which is formed at a circumferential edge on the gas path surface 64*pa* is formed. The end surface has a rear end surface 62*ba* facing a downstream side Dad where the combustion gas G flows, a front end surface 62*fa* facing an upstream side Dau on a side opposite to the downstream side Dad and having a back-to-back relationship with the rear end surface 62*ba*, and a lateral end surface 63*a* facing a side in a lateral direction Dc perpendicular to the gas flowing direction Da in which the rear end surface 62*b* and the front end surface 62*fa* are arranged. In the groove forming step S2, a groove 81 recessed in a direction perpendicular to the lateral end surface 63 from the lateral end surface 63 and extending in a direction in which the lateral end surface 63 extends is formed within the lateral end surface 63 of the intermediate product 80 avoiding a part on the upstream side Dau and a part on the downstream side Dad. In the lid disposing step S3, an opening of the groove 81 is blocked by a lid member 82, and a main passage portion 72 extending in a direction in which the lateral end surface 63 extends is formed along the lateral end surface 63 by the groove 81 and the lid member 82. In the passage forming step S4, one or more narrow passage portions 73 penetrating the inside of the main passage portion 72 from the rear end surface 62*b* are formed. The area of an opening in the one or more narrow passage portions 73 on the rear end surface 62*b* is smaller than a cross-sectional area of the main passage portion.

Since the lateral passages 70 of the flow channel forming plate manufactured in the present aspect have one or more narrow passage portions 73, compared to a case of having no narrow passage portions 73, the flow rate of the cooling air Ac passing through these lateral passages 70 can be curbed. In addition, in the present aspect, compared to a case in which the cross-sectional area at each of positions in the lateral passage 70 between the inlet 74 for the cooling air Ac and the outlet 75 for the cooling air Ac is the same, the cross-sectional area in the main passage portion 72 can be increased. For this reason, when the lateral passage 70 is projected onto the gas path surface 64*p* from the opposite gas path side Dra, the projection area of the lateral passage 70 within the gas path surface 64*p* can be expanded, and the gas path surface 64*p* can be cooled over a wide area.

EXPLANATION OF REFERENCES

11 Gas turbine rotor
14 Intermediate casing
15 Gas turbine casing
17 Inner cover
17*a* Radially outer edge
20 Compressor
21 Compressor rotor
22 Rotor shaft
23 Turbine blade row
23*a* Turbine blade
25 Compressor casing
26 Turbine vane row
26*a* Turbine vane
30 Combustor
40 Turbine
41 Turbine rotor
42 Rotor shaft
43 Turbine blade row
43*a* Turbine blade
43*b* Blade body
43*p* Platform
45 Turbine casing
45*a* Outer casing
45*b* Inner casing
45*c* Isolation ring
45*d* Ring segment
46 Turbine vane row
46*a* Turbine vane
46*b* Blade body
46*i* Inner shroud
46*o* Outer shroud
49 Combustion gas flow channel
50 Turbine vane 51 Blade body
52 Leading edge
53 Trailing edge
54 Suction side
55 Pressure side
59 Retainer
60i Inner shroud
60o Outer shroud
61 Shroud main body
62f, 62fa Front end surface
62b, 62ba Rear end surface
63, 63a Lateral end surface
63n, 63na Suction side end surface (or second lateral end surface)
63p, 63pa Pressure side end surface (or first lateral end surface)
64o, 64oa Opposite gas path surface
64p, 64pa Gas path surface
65, 65a Circumferential wall
65f, 65fa Front wall
65b, 65ba Rear wall
65n, 65na Suction side wall (or side wall)
65p, 65pa Pressure side wall (or side wall)
66, 66a Recessed portion
70 Lateral passage
70n Suction side passage (or second lateral passage)
70p Pressure side passage (or first lateral passage)
71 Inlet passage portion
72 Main passage portion
73 Narrow passage portion
74 Inlet
75 Outlet
76 Uneven surface
79 Rear end injection passage
80 Intermediate product
81 Groove
82 Lid member
85a First electrode
85b Second electrode
85c Third electrode
85d Fourth electrode
Da Axial direction (gas flowing direction)
Dau Axial upstream side (or upstream side)
Dad Axial downstream side (or downstream side)
Dc Circumferential direction (or lateral direction)
Dcp Circumferential pressure side (or first lateral side)
Dcn Circumferential suction side (or second lateral side)
Dh Blade height direction
Dr Radial direction
Dri Radially inner side
Dro Radial outer side
Drp Gas path side
Dra Opposite gas path side
Dp Passage extension direction
A Air
Acom Compressed air
Ac Cooling air
G Combustion gas

What is claimed is:

1. A flow channel forming plate defining a combustion gas flow channel in which combustion gas flows in a gas turbine, the flow channel forming plate comprising:
a gas path surface which comes into contact with the combustion gas;
an opposite gas path surface which faces a side opposite to the gas path surface;
an end surface which is formed at a circumferential edge on the gas path surface; and
one or more lateral passages which are formed between the gas path surface and the opposite gas path surface and in which cooling air flows,
wherein the end surface has a rear end surface facing a downstream side where the combustion gas flows, a front end surface facing an upstream side on a side opposite to the downstream side and having a back-to-back relationship with the rear end surface, and a lateral end surface facing a side in a lateral direction perpendicular to a gas flowing direction in which the rear end surface and the front end surface are arranged,
wherein the one or more lateral passages have, along the gas path surface and the lateral end surface, a main passage portion extending only in a direction in which the lateral end surface extends, and one or more narrow passage portions extending from an end of the main passage portion on the downstream side toward the rear end surface and opening on the rear end surface,
wherein an area of an opening in the one or more narrow passage portions on the rear end surface is smaller than a cross-sectional area of the main passage portion, and
wherein the one or more lateral passages have only the openings in the one or more narrow passage portions as outlets for cooling air which has flowed through the one or more lateral passages.

2. The flow channel forming plate according to claim 1,
wherein the lateral end surface has a first lateral end surface facing a first lateral side and a second lateral end surface facing a second lateral side, of the first lateral side that is one side in the lateral direction and the second lateral side that is the other side therein,
wherein the one or more lateral passages have a first lateral passage and a second lateral passage,
wherein the first lateral passage lies along the first lateral end surface, and
wherein the second lateral passage lies along the second lateral end surface.

3. The flow channel forming plate according to claim 2 further comprising:
a circumferential wall which is provided along the end surface; and
a plurality of rear end injection passages,
wherein the circumferential wall protrudes to an opposite gas path side from the opposite gas path surface of a gas path side that is a side where the gas path surface is present with respect to the opposite gas path surface and the opposite gas path side where the opposite gas path surface is present with respect to the gas path surface,
wherein the opposite gas path surface and the circumferential wall form a recessed portion which is recessed toward the gas path side and into which cooling air flows,
wherein all of the plurality of rear end injection passages penetrate a surface defining the recessed portion from the rear end surface, and
wherein the plurality of rear end injection passages are arranged in the lateral direction between the first lateral passage and the second lateral passage.

4. The flow channel forming plate according to claim 1,
wherein the one or more narrow passage portions have a plurality of narrow passage portions, and
wherein the plurality of narrow passage portions are arranged in a direction parallel to the gas path surface.

5. The flow channel forming plate according to claim 1, wherein the one or more narrow passage portions extend in the same direction as a passage extension direction in which the main passage portion extends.

6. A blade comprising:
the flow channel forming plate according to claim 1; and
a blade body which extends from the gas path surface in a blade height direction having a direction component perpendicular to the gas path surface and of which a cross-sectional shape perpendicular to the blade height direction constitutes a blade profile.

7. A gas turbine comprising:
a combustor which is configured to generate combustion gas; and
a turbine which is configured to be driven by means of combustion gas,
wherein the turbine has the flow channel forming plate according to claim 1.

8. A flow channel forming plate defining a combustion gas flow channel in which combustion gas flows in a gas turbine, the flow channel forming plate comprising:
a gas path surface which comes into contact with the combustion gas;
an opposite gas path surface which faces a side opposite to the gas path surface;
an end surface which is formed at a circumferential edge on the gas path surface; and
one or more lateral passages which are formed between the gas path surface and the opposite gas path surface,
wherein the one or more lateral passages have a main passage portion extending in only one direction toward a part on the end surface along the gas path surface, and a plurality of narrow passage portions extending from an end of the main passage portion to a part on the end surface and opening at a part on the end surface,
wherein all of the plurality of narrow passage portions extend in a passage extension direction in which the main passage portion extends,
wherein the plurality of narrow passage portions are arranged in a direction parallel to the gas path surface,
wherein a total area of openings at parts on the end surfaces in the plurality of respective narrow passage portions is smaller than a cross-sectional area of the main passage portion, and
wherein the one or more lateral passages have only the openings in the plurality of narrow passage portions as outlets for cooling air which has flowed through the one or more lateral passages.

9. The flow channel forming plate according to claim 8, wherein a width of the main passage portion in a direction perpendicular to the passage extension direction and parallel to the gas path surface is larger than a width of the main passage portion in a direction perpendicular to the passage extension direction and perpendicular to the gas path surface.

10. The flow channel forming plate according to claim 8, wherein a surface facing a side opposite to the gas path surface in the main passage portion, of surfaces defining a space inside the main passage portion, is an uneven surface on which unevenness is repeated in the passage extension direction.

11. The flow channel forming plate according to claim 8, wherein the entirety of the main passage portion extends towards the part on the end surface along the gas path surface.

12. A method of manufacturing a flow channel forming plate defining a combustion gas flow channel in which combustion gas flows in a gas turbine, the flow channel forming plate comprising:
a gas path surface which comes into contact with the combustion gas;
an opposite gas path surface which faces a side opposite to the gas path surface;
an end surface which is formed at a circumferential edge on the gas path surface; and
one or more lateral passages which are formed between the gas path surface and the opposite gas path surface and in which cooling air flows,
wherein the end surface has a rear end surface facing a downstream side where the combustion gas flows, a front end surface facing an upstream side on a side opposite to the downstream side and having a back-to-back relationship with the rear end surface, and a lateral end surface facing a side in a lateral direction perpendicular to a gas flowing direction in which the rear end surface and the front end surface are arranged,
wherein the one or more lateral passages have, along the gas path surface and the lateral end surface, a main passage portion extending only in a direction in which the lateral end surface extends, and one or more narrow passage portions extending from an end of the main passage portion on the downstream side toward the rear end surface and opening on the rear end surface,
wherein an area of an opening in the one or more narrow passage portions on the rear end surface is smaller than a cross-sectional area of the main passage portion, and
wherein the one or more lateral passages have only the openings in the one or more narrow passage portions as outlets for cooling air which has flowed through the one or more lateral passages, the method comprising:
an intermediate product forming step, a groove forming step, a lid disposing step, and a passage forming step,
wherein in the intermediate product forming step, an intermediate product having the gas path surface, the opposite gas path surface, and the end surface is formed,
wherein in the groove forming step, a groove recessed in a direction perpendicular to the lateral end surface from the lateral end surface and extending in a direction in which the lateral end surface extends is formed within the lateral end surface of the intermediate product avoiding a part on the upstream side and a part on the downstream side,
wherein in the lid disposing step, an opening of the groove is blocked by a lid member, and the main passage portion is formed along the lateral end surface by the groove and the lid member, and
wherein in the passage forming step, the one or more narrow passage portions are formed.

* * * * *